UNITED STATES PATENT OFFICE.

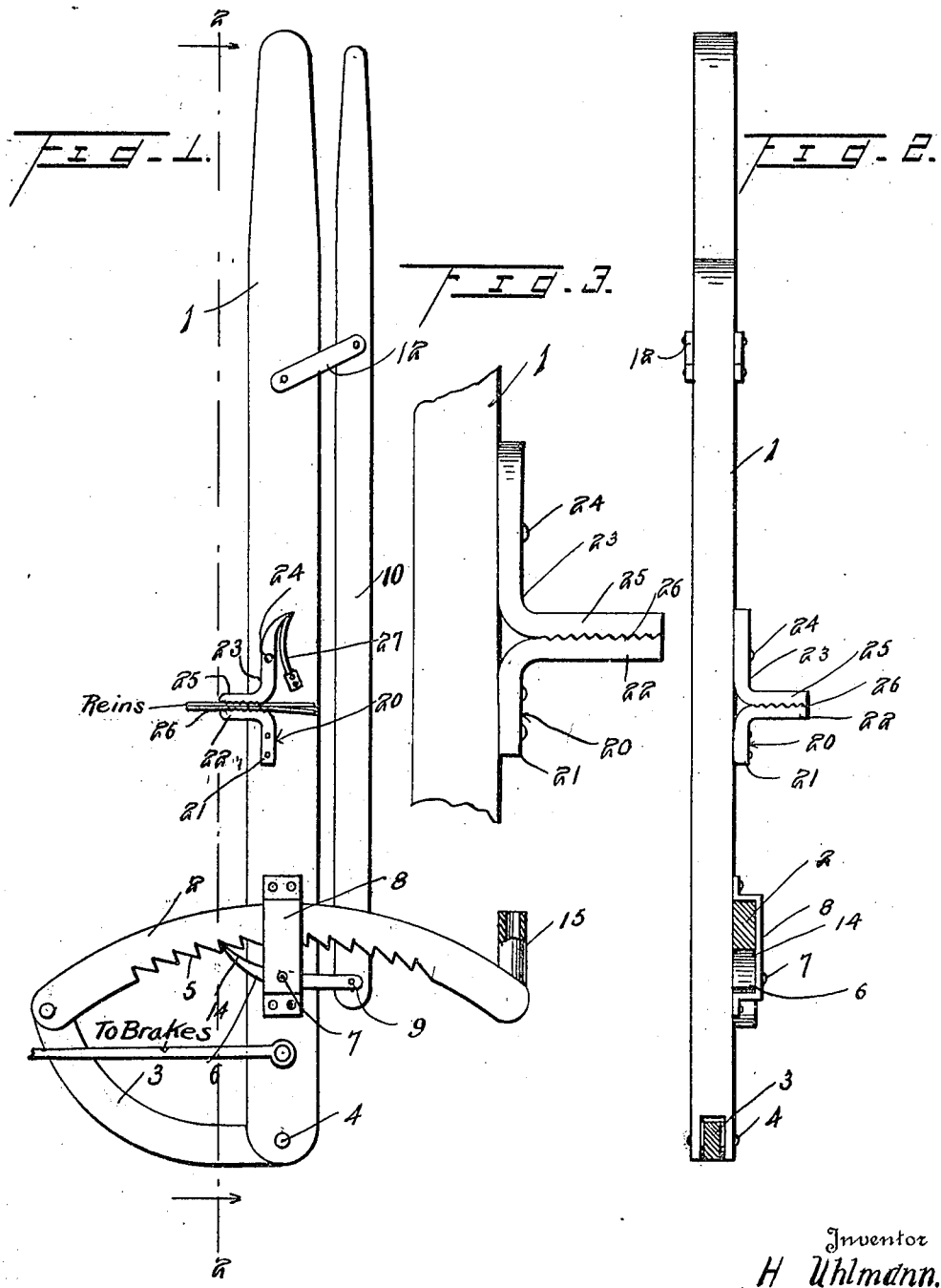

HUGO UHLMANN, OF BUCKHART, MISSOURI.

LEVER.

1,256,396.

Specification of Letters Patent.  Patented Feb. 12, 1918.

Application filed August 25, 1916.  Serial No. 116,835.

*To all whom it may concern:*

Be it known that I, HUGO UHLMANN, a citizen of the United States, residing at Buckhart, in the county of Douglas and State of Missouri, have invented certain new and useful Improvements in Levers; and I do hereby declare the following to be a full, clear, and exact description of the invention, such as will enable others skilled in the art to which it appertains to make and use the same.

This invention relates to a brake lever structure for use upon farm wagons, and the primary object of the invention is to provide, in combination with a pivotally mounted brake lever, a rein holder which is carried by the brake lever and means to prevent accidental pivotal movement of the brake lever in a brake loosening direction, and to arrange the rein holder so that a pull upon reins carried thereby will move the brake lever in a brake tightening position.

A further object of this invention is to provide a rein holder which is attached to the lever and comprises a rigid member and a pivoted member, which pivoted member is engaged by a flat spring for holding it in a rein engaging position with respect to the rigid member.

With the foregoing and other objects in view this invention consists in such novel features of construction, combination and arrangement of parts as will be hereinafter more fully described, illustrated in the accompanying drawing and claimed.

In describing the invention in detail reference will be had to the accompanying drawing wherein like characters designate like and corresponding parts throughout the several views, and in which:—

Figure 1 is a side elevation of the improved lever structure.

Fig. 2 is an edge view of the lever structure, and

Fig. 3 is an enlarged edge view of the rein holder structure.

Referring more particularly to the drawing, 1 designates the hand lever, which is particularly designed for use upon farm wagons, for applying the brakes, but it is to be understood, that the lever may be used for any analogous purpose, without departing from the spirit of this invention. A quadrant 2 is provided, which is rigidly supported, and has an arm 3 connected thereto and extending beneath the quadrant to the axis or center of the circle of which the arcuate edges of the quadrant form a part. The lever 1 is pivotally connected as shown at 4 to the arm 3.

The quadrant 2 has a plurality of teeth 5 formed upon its lower edge, which are adapted to be engaged by a pawl 6. The pawl 6 is pivotally mounted upon a pin 7, which pin is carried by the lever 1 and by a bracket 8, which is attached to the lever. The pawl 6 is also pivotally connected as shown at 9 to a bar 10 which is supported along one edge of the lever 1. The bar 10 is connected to the lever 1 by a pair of metallic bars or straps 12 pivotally connected to the lever 1 and to the bars 11 as clearly shown in Fig. 1 of the drawing, so as to permit the bars to be moved longitudinally of the lever independent of movement of the lever, for rocking the pawl 6 by moving its end 14 out of engagement with any one of the teeth 5. A whip socket 15 is carried by one end of the quadrant 2.

A rein holder structure generically indicated by the numeral 20 is attached to the lever 1 and it comprises a rigid member 21, which has a corrugated rein engaging portion or jaw 22. The jaw 22 extends outwardly from the lever 1 as clearly shown in Fig. 3 of the drawing, so as to provide a surface for engaging practically the entire width of the rein. A pivoted member 23 is provided which is pivotally connected as shown at 24 to the lever 1 and it has a rein engaging jaw 25 formed upon its lower end, which jaw is shaped for lying above the jaw 22 and in engagement with the same, when reins are not attached to the holder. The under surface of the jaw 25 is corrugated, as shown at 26 for coaction with the upper corrugated edge of the jaw 22 for holding reins rigidly between the two jaws. A flat spring 27 is attached to the lever 1 and engages the upper end of the pivoted member 23, holding the jaw 25 of the member 23 downwardly in a rein engaging position at all times, except when the member 22 is rocked upon its pivot for releasing its engagement with the rein.

The rein holder structure 20 is attached to the lever 1 as clearly shown in Fig. 1 of the drawings in such a manner that any pull upon the reins held by the holder would move the lever 1 in a direction to tighten the brakes of the wagon upon which the lever is mounted, thereby materially decreasing the liability of the team or horse running away when left standing by the driver, in that the harder the pull would be upon the reins, the tighter the brakes would be applied.

From the foregoing description taken in connection with the accompanying drawing, the advantages of construction and of the method of operation of the improved lever will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

In a device as set forth, the combination of a pivoted brake operating lever, a rein holder carried by said lever for moving the lever in a brake tightening direction upon a pull upon the reins carried by said holder, and means for preventing accidental movement of said lever in a brake loosening position.

In testimony whereof I affix my signature in presence of two witnesses.

HUGO UHLMANN.

Witnesses:
T. A. CONROY,
FRANK SCHERER.

Copies of this patent may be obtained for five cents each, by addressing the "Commissioner of Patents, Washington, D. C."